(12) United States Patent
Pisera et al.

(10) Patent No.: US 8,763,987 B2
(45) Date of Patent: Jul. 1, 2014

(54) BUTTERFLY VALVE AND SYSTEM EMPLOYING SAME AND METHOD FOR USING SAME FIELD

(75) Inventors: Jaroslaw W. Pisera, Bedford, MA (US); David B. Chamberlain, Hooksett, NH (US); Robert Krmpotich, Salem, NH (US); Paul D. Lucas, Melrose, MA (US)

(73) Assignee: MKS Instruments, Inc., Andover, MA (US)

( * ) Notice: Subject to any disclaimer, the term of this patent is extended or adjusted under 35 U.S.C. 154(b) by 369 days.

(21) Appl. No.: 12/611,760

(22) Filed: Nov. 3, 2009

(65) Prior Publication Data
US 2011/0101259 A1 May 5, 2011

(51) Int. Cl.
*F16K 1/22* (2006.01)
(52) U.S. Cl.
USPC .............. 251/305; 251/129.11; 137/329.01; 137/15.06; 137/15.07; 137/237
(58) Field of Classification Search
CPC .............................. F02D 9/10051; F16K 1/22
USPC ............. 251/305, 129.11; 137/15.05, 15.06, 137/15.07, 329, 329.01, 329.02, 329.05, 137/237, 243
See application file for complete search history.

(56) References Cited

U.S. PATENT DOCUMENTS

| | | | | |
|---|---|---|---|---|
| 3,311,128 | A * | 3/1967 | Taylor | 137/383 |
| 3,498,584 | A * | 3/1970 | Bowers | 251/305 |
| 4,281,817 | A * | 8/1981 | Adams et al. | 251/305 |
| 4,815,693 | A * | 3/1989 | James et al. | 251/14 |
| 4,836,499 | A | 6/1989 | Steele et al. | |
| 5,651,343 | A * | 7/1997 | Evans et al. | 123/339.26 |
| 6,029,949 | A * | 2/2000 | Brown et al. | 251/305 |
| 6,164,623 | A * | 12/2000 | Ito et al. | 251/305 |
| 6,176,467 | B1 * | 1/2001 | Yamashita et al. | 251/305 |
| 6,367,773 | B1 * | 4/2002 | Ito | 251/305 |

(Continued)

FOREIGN PATENT DOCUMENTS

CN    2591347    * 10/2003
DE    4225516 A1    2/1994

(Continued)

OTHER PUBLICATIONS

Office Action dated Aug. 23, 2013 from Corresponding Japanese Patent Application No. 2012-537894 (086400-0114).

*Primary Examiner* — Eric Keasel
*Assistant Examiner* — Minh Le
(74) *Attorney, Agent, or Firm* — McDermott Will & Emery LLP

(57) ABSTRACT

A butterfly valve comprises: a body including a valve opening; and a flapper rotatably mounted about a rotation axis so as to be movable relative to the valve opening. The flapper is rotatable at least 180° about the rotation axis so that the flapper is movable to at least one fully opened position, at least one fully closed position 90° apart from the fully opened position, and a third position, either fully opened or fully closed, 180° from the other like position. In one embodiment the flapper is rotatable at least 360° about the rotation axis so that the flapper is movable to each of two opened positions 180° apart, and two closed positions 180° apart from each other and 90° and 270° apart from each of the fully opened positions. The valve can be easily calibrated and controlled, and cleaned to extend the useful service life between cleanings.

16 Claims, 15 Drawing Sheets

(56) References Cited

U.S. PATENT DOCUMENTS

| | | | |
|---|---|---|---|
| 6,505,643 B2 * | 1/2003 | Scholten et al. | 137/554 |
| 6,932,051 B2 * | 8/2005 | Soshino et al. | 123/337 |
| 7,069,902 B2 * | 7/2006 | Arai et al. | 123/337 |
| 2003/0111046 A1 * | 6/2003 | Han | 123/399 |
| 2004/0183040 A1 * | 9/2004 | Kvvon | 251/14 |
| 2005/0183705 A1 * | 8/2005 | Nanba et al. | 123/568.24 |
| 2006/0272322 A1 * | 12/2006 | Abram et al. | 60/324 |
| 2007/0194265 A1 * | 8/2007 | Shenk | 251/305 |
| 2009/0309056 A1 * | 12/2009 | Tsai | 251/231 |
| 2010/0276621 A1 * | 11/2010 | Zwick | 251/305 |
| 2011/0073789 A1 * | 3/2011 | Yeary et al. | 251/118 |

FOREIGN PATENT DOCUMENTS

| | | |
|---|---|---|
| DE | 102007000406 A1 | 2/2008 |
| JP | 61-278667 | 12/1986 |
| JP | 1-126476 | 5/1989 |
| JP | 3017058 | 10/1995 |
| JP | 2001173466 A | 6/2001 |
| JP | 2003-314377 | 11/2003 |
| JP | 2007046662 A * | 2/2007 |

\* cited by examiner

ND SYSTEM
BUTTERFLY VALVE AND SYSTEM EMPLOYING SAME AND METHOD FOR USING SAME FIELD

The disclosure relates to butterfly or flapper valves, and methods and systems employing same, and more particularly, to an improved butterfly valve constructed so that its flapper is rotatable at least 180° about the rotation axis so that the flapper is movable to at least one fully opened position, at least one fully closed position 90° apart from the fully opened position, and a third position, either fully opened or fully closed, 180° from the other like position.

BACKGROUND

Flapper or butterfly valves are well known for controlling the flow of a fluid through the valve. Those used in deposition systems and other tools (such as deposition vacuum chambers) are useful in controlling the flow of a vapor or gas from the tool so as to control the pressure in and/or flow of vapor and gas from the tool. The flapper is usually in the shape of a disk that is rotatable through 90° between a completely opened position wherein the plane of the disk is oriented 90° relative to the plane of the valve seat that defines the valve opening, and a completely closed position wherein the plane of the disk and valve seat are coplanar so that the flapper forms a closure with the valve seat of the valve opening. In some valves the flapper forms a sealed closure with the valve seat of the valve opening, while in others an unsealed closure is sufficient for the applications to which the valves are used. One common application for the flapper valve is to use the valve to maintain the pressure within a vacuum chamber by controlling the rate of exhaust of gases and vapors from the chamber.

During operation such as one in which the valve is used to control the pressure in or the rate of exhaust of gas and vapor from a vacuum chamber, the interior of the valve and the flapper are usually exposed to various vapors and gases that flow through it. Inevitably these vapors and gases can condense and leave deposits inside the valve, particularly at the edges and the side of the flapper facing the upstream flow of the controlled vapor or gas. These deposits can build to the point where they prevent the flapper from completely closing. This in turn affects the ability of the valve to control the rate of flow of gas and vapor through the valve when the valve needs to be positioned at or near the fully closed position. Valve removal is costly due to associated tool downtime and labor.

In order to extend the useable life of the valve before cleaning is required, many of these type valves include heaters embedded in the flapper to keep the gas and vapors above the solid and liquid phase so as to prevent the gases and vapors from depositing inside the valve. However, valve heating adds additional cost and complexity and may not be desirable with respect to the space limitations and power consumption in the space and application in which the valve is used.

Another approach to cleaning the interior of the flapper valve is to use the flapper of the valve to break up the deposits during a purging process by applying a relatively high enough torque to the flapper against the deposits so that the flapper can dislodge or break up the deposits. However, a high torque solution requires a higher cost motor and/or gearbox with high power/cost drive electronics for the motor.

SUMMARY

In accordance with one aspect of the invention, a butterfly valve comprises: a body including a valve opening; and a flapper rotatably mounted about a rotation axis so as to be movable relative to the valve opening; wherein the flapper is rotatable at least 180° about the rotation axis so that the flapper is movable to at least one fully opened position, at least one fully closed position 90° apart from the fully opened position, and a third position, either fully opened or fully closed, 180° from the other like position.

In accordance with another aspect of the invention, a deposition system comprises: a tool for depositing material during a process; a valve for controlling the flow of material from the tool; the valve including: a body including a valve opening; and a flapper rotatably mounted about a rotation axis so as to be movable relative to the valve opening; wherein the flapper is rotatable at least 180° about the rotation axis so that the flapper is movable to at least one fully opened position, at least one fully closed position 90° apart from the fully opened position, and a third position, either fully opened or fully closed, 180° from the other like position.

In accordance with yet another aspect of the invention a method of maintaining a flapper valve clean of material deposited on both sides and all of the edges of the flapper and in a valve opening during use, comprises: exposing the flapper to a cleaning material flowing through the valve while operating the flapper so as to (a) expose each side of the flapper and the various edges of the flapper to the cleaning material flowing through the valve so that the fluid flowing through the valve can dislodge the deposited material exposed to the flowing fluid, and (b) move the flapper into, through and out of either or both of the closed positions in either or both rotational directions so that the edge of the flapper can help dislodge deposited material on interior portions of the valve opening.

GENERAL DESCRIPTION OF THE DRAWINGS

DETAILED DESCRIPTION OF THE DRAWINGS

Figure 1:
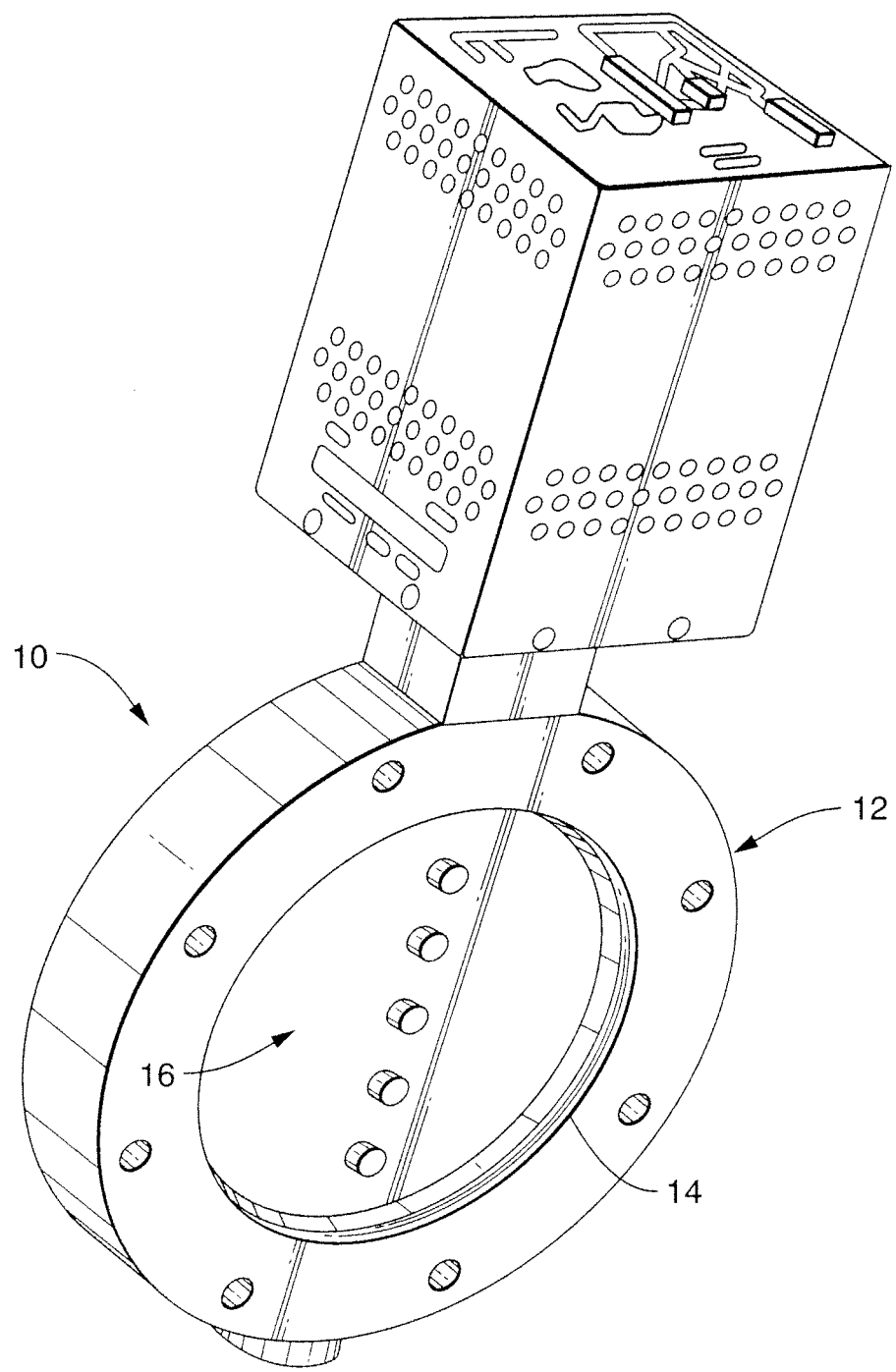
FIG. 1 is a perspective view of an embodiment of a flapper valve including a flapper can be rotated at least 180° between two fully opened positions and showing the flapper in a closed position.
Figure 2:
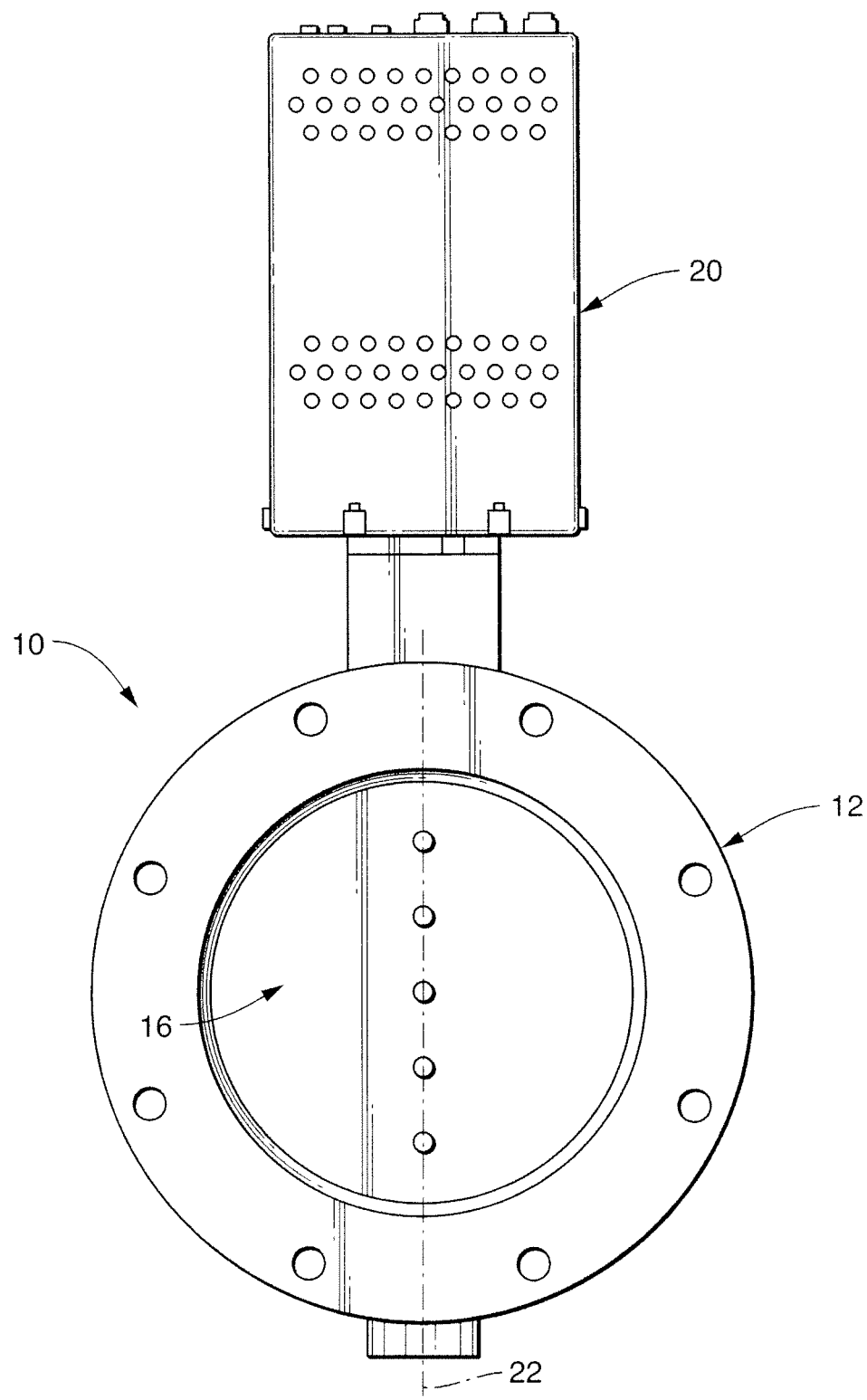
FIG. 2 is a front view of the embodiment of the flapper valve shown in FIG. 1 showing the flapper valve in a closed position.

In the drawings, like numerals refer to like parts. In FIG. 1-6, the flapper valve 10 includes a housing 12 having an opening 14 defining the valve opening. A valve flapper 16 is positioned within the valve opening, rotatably mounted on a shaft 18 (shown in FIG. 3). The valve flapper is shown in the form to a disk which can be of uniform thickness or tapered and which is rotatable within a straight-bored or tapered opening 14 as shown in FIGS. 7-16. The disk and valve opening each defines a plane, which in turn defines the angular position of the disk relative to the valve opening 14. The flapper is secured to a shaft 18, which in turn is coupled to a motor 20 so that the motor is capable of rotating the shaft and flapper 16 around the axis 22 of the shaft. In one embodiment, the motor is a reversible stepper motor capable of moving the shaft and the flapper at least 180° about the rotation axis 22 through a plurality of discreet angular positions corresponding to each incremental step of the motor, and in a second embodiment the motor is a reversible stepper motor capable of moving the shaft and the flapper at least 360°. The motor 20 includes a control unit (not shown in FIGS. 1-16) constructed to control the operation of the flapper valve as described by way of example, in greater detail described below and illustrated in FIGS. 17-21.

Figure 3:
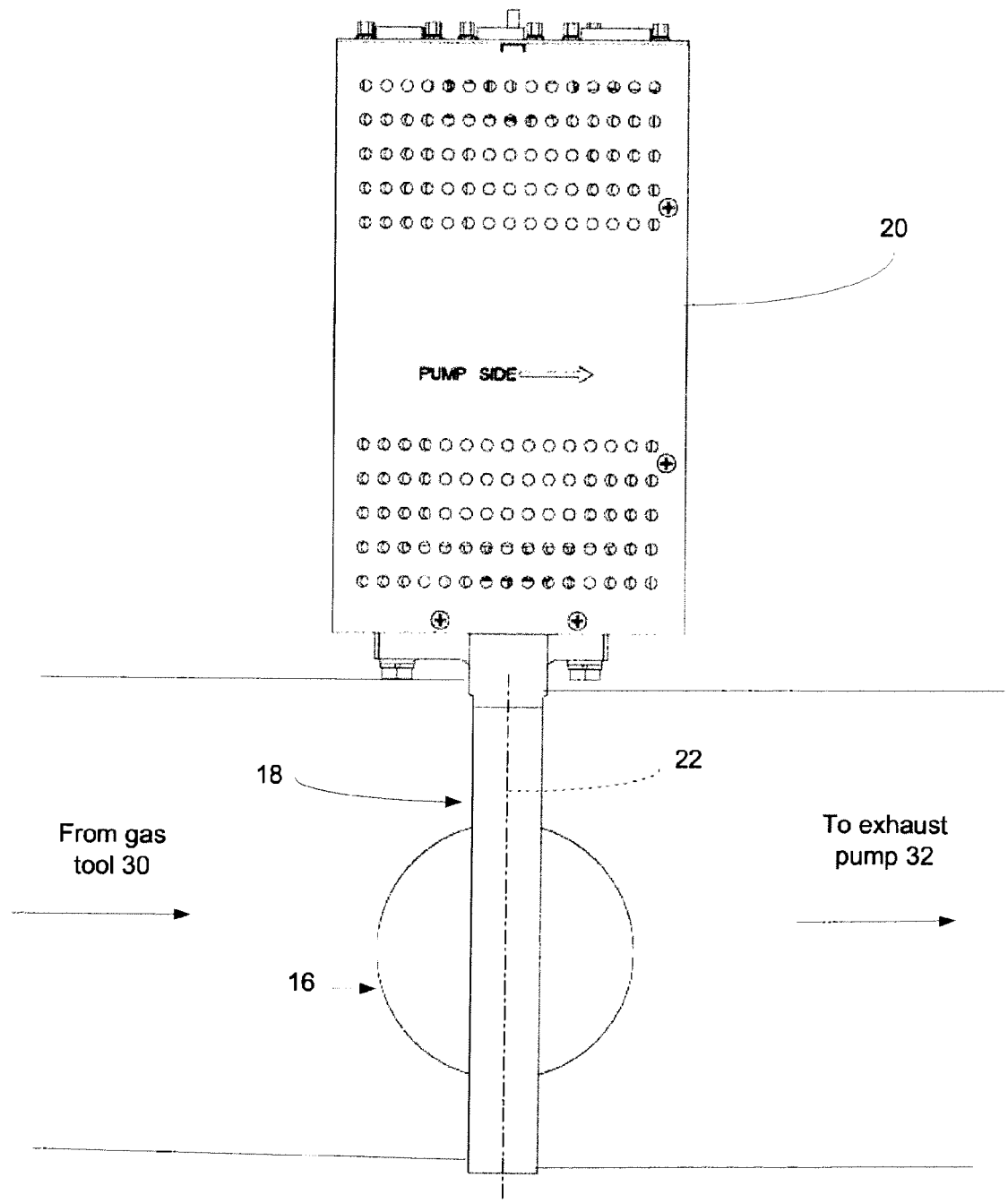
FIG. 3 is a side view, partially in cross section, of the flapper valve shown in FIG. 1 showing the flapper valve in an opened position.
Figure 4:
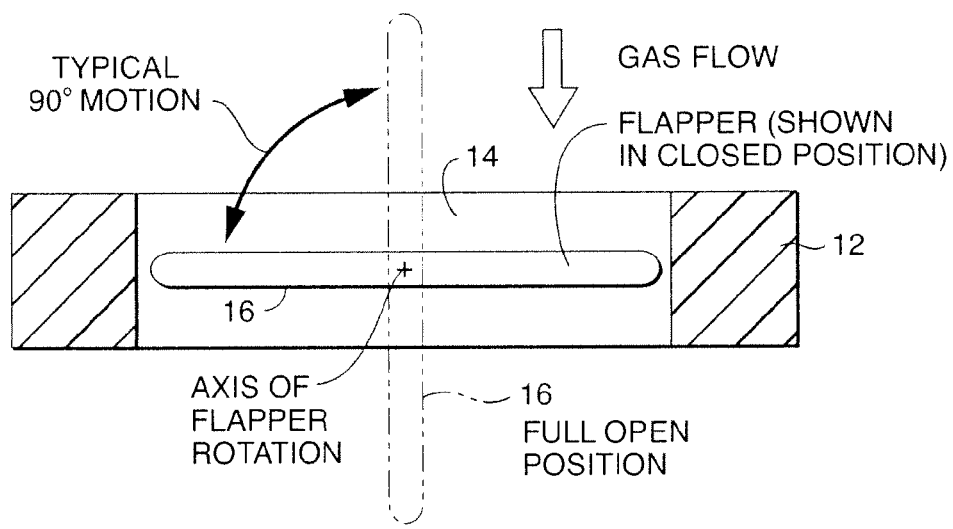
FIG. 4 is a simplified cross-section taken through the flapper rotatable through at least 360° of rotation.

The flapper valve 10 is typically mounted between a tool 30 and an exhaust 32 (usually connected to a pump, such as a vacuum pump (not shown) arranged to pump gas and vapor from the tool so as to maintain the pressure within the chamber at a desired range) as best seen in FIG. 3. As constructed the pressure of the gas or vapor in the tool can be controlled by controlling pressure in the tool, or the rate of flow of the gas or vapor being exhausted by controlling the angular position of the flapper 16. In such applications, a pressure sensor (not shown) for providing a signal representative of the pressure being controlled can be used to control the setting of the valve.

In accordance with one embodiment of the invention, such as shown in FIGS. 7-16, the flapper 16 is rotatably mounted on the shaft 18 so that it can rotate at least 180° about the rotation axis 22 so that the flapper 16 is rotatable at least 180° about the rotation axis so that the flapper is movable to at least one fully opened position, at least one fully closed position 90° apart from the fully opened position, and a third position, either fully opened or fully closed, 180° from the other like position. In another embodiment the flapper can rotate at least 360° about the rotation axis 22 so that the flapper 16 is movable to each of two fully closed positions 180° apart form each other, and two fully opened positions 180° apart from each other and 90° and 270° apart from each of the fully closed positions.

Thus in one embodiment, the flapper can rotate at least 180° within two quadrants so that for each position of the flapper in one quadrant there exists a complementary position of the flapper in the other quadrant, wherein the two complementary positions provide identical flow control. Where the flapper is rotatable at least 360° about its axis 22 in either of two directions, for each position of the flapper in one quadrant, there exists four complementary positions of the flapper.

Figure 7:
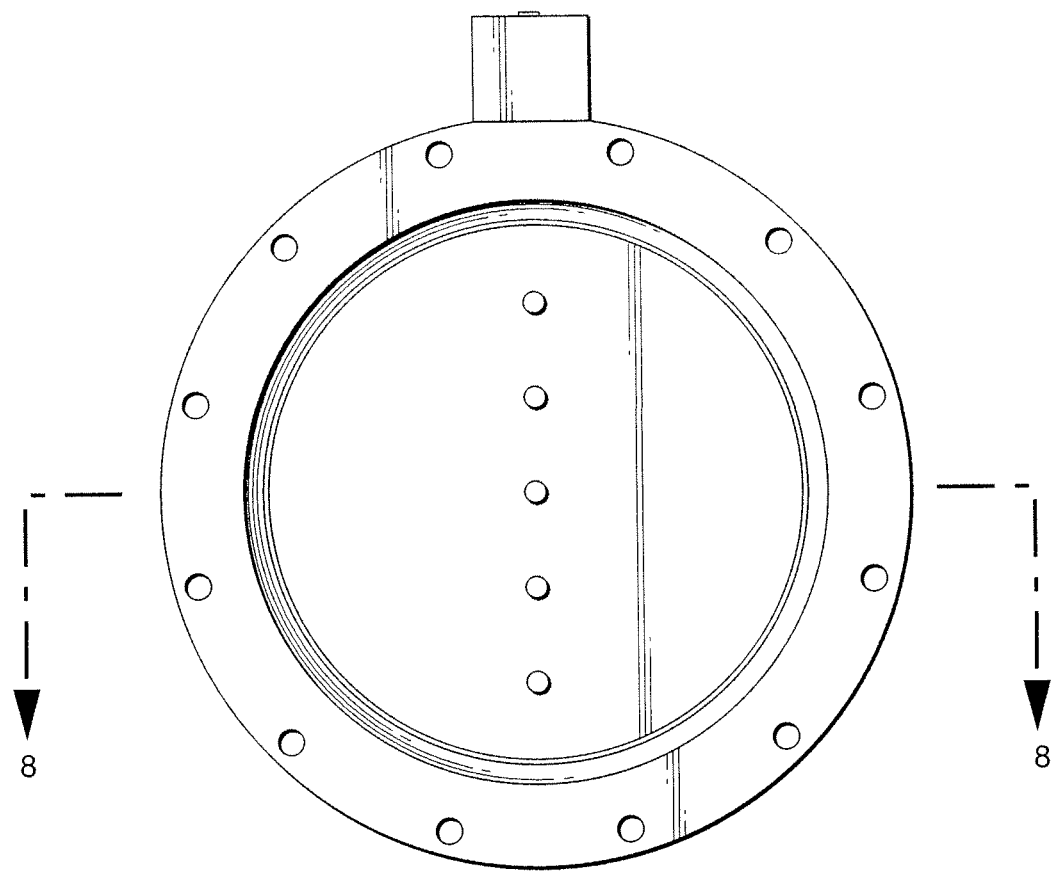
FIG. 7 is a front view of another embodiment of the flapper valve in which the valve opening and flapper are both tapered.
Figure 8:
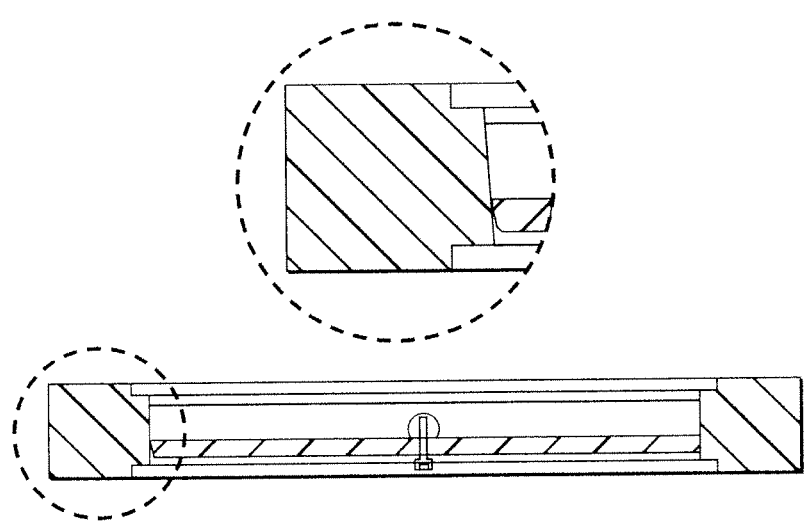
FIG. 8 is a cross sectional view of the flapper valve taken along section line 8-8 of FIG. 7.
Figure 9:
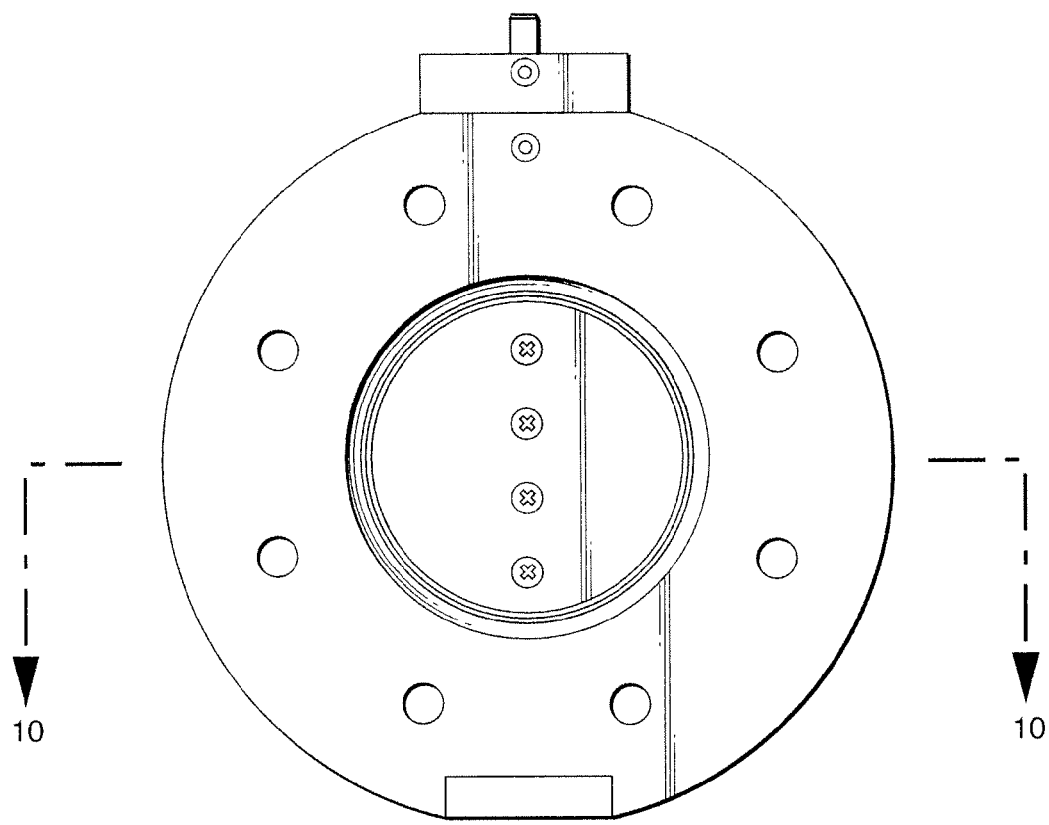
FIG. 9 is a front view of another embodiment of the flapper valve in which the valve opening is straight and flapper is tapered.
Figure 10:
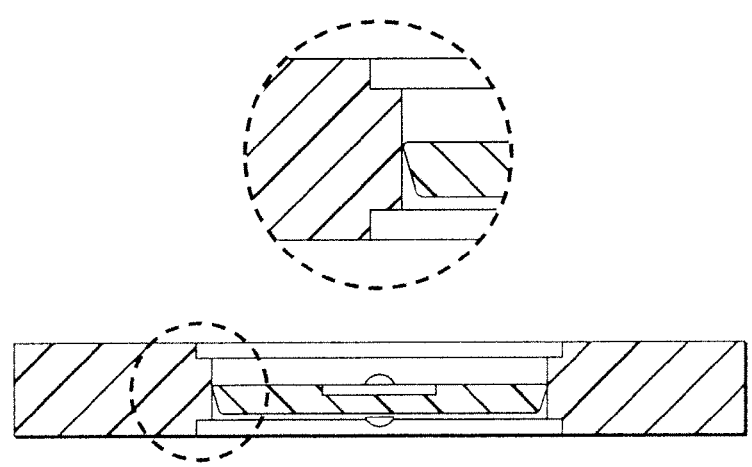
FIG. 10 is a cross sectional view of the flapper valve taken along section line 10-10 of FIG. 9.
Figure 11:
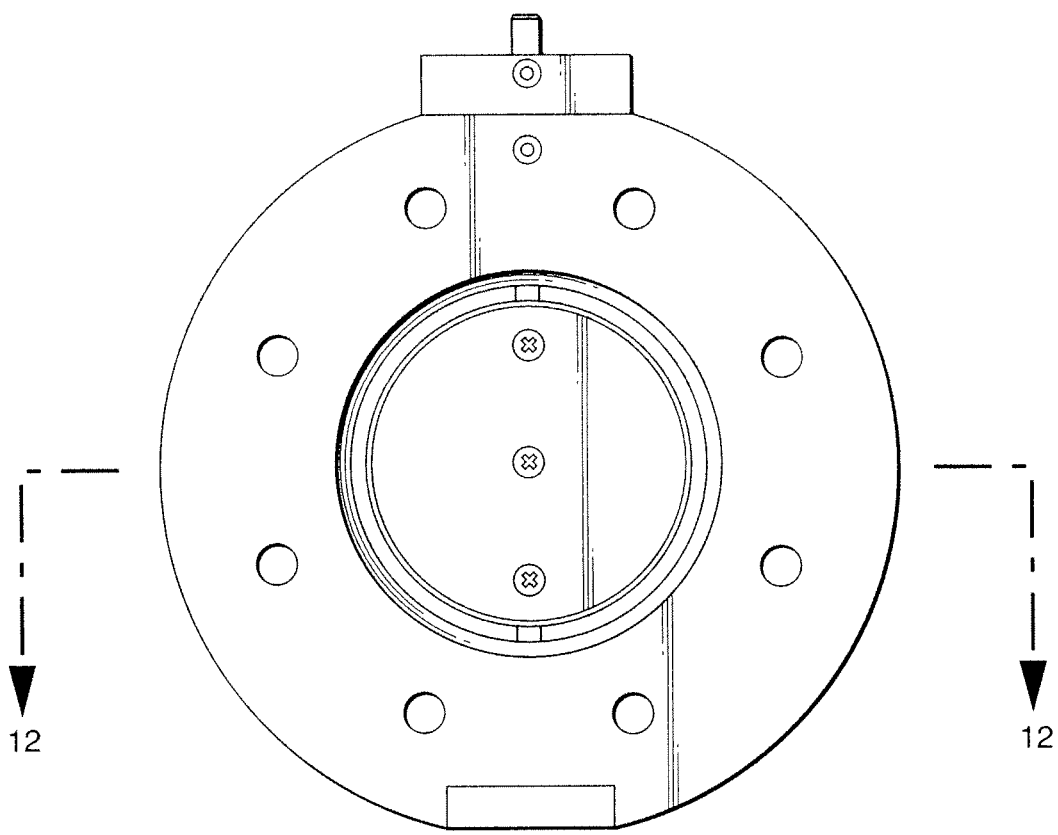
FIG. 11 is a front view of another embodiment of the flapper valve in which the valve opening and flapper are both straight.
Figure 12:
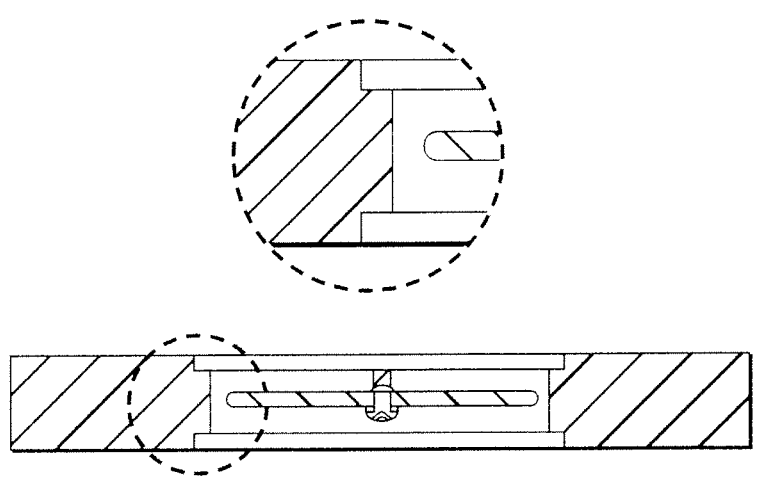
FIG. 12 is a cross sectional view of the flapper valve taken along section line 12-12 of FIG. 11.
Figure 13:
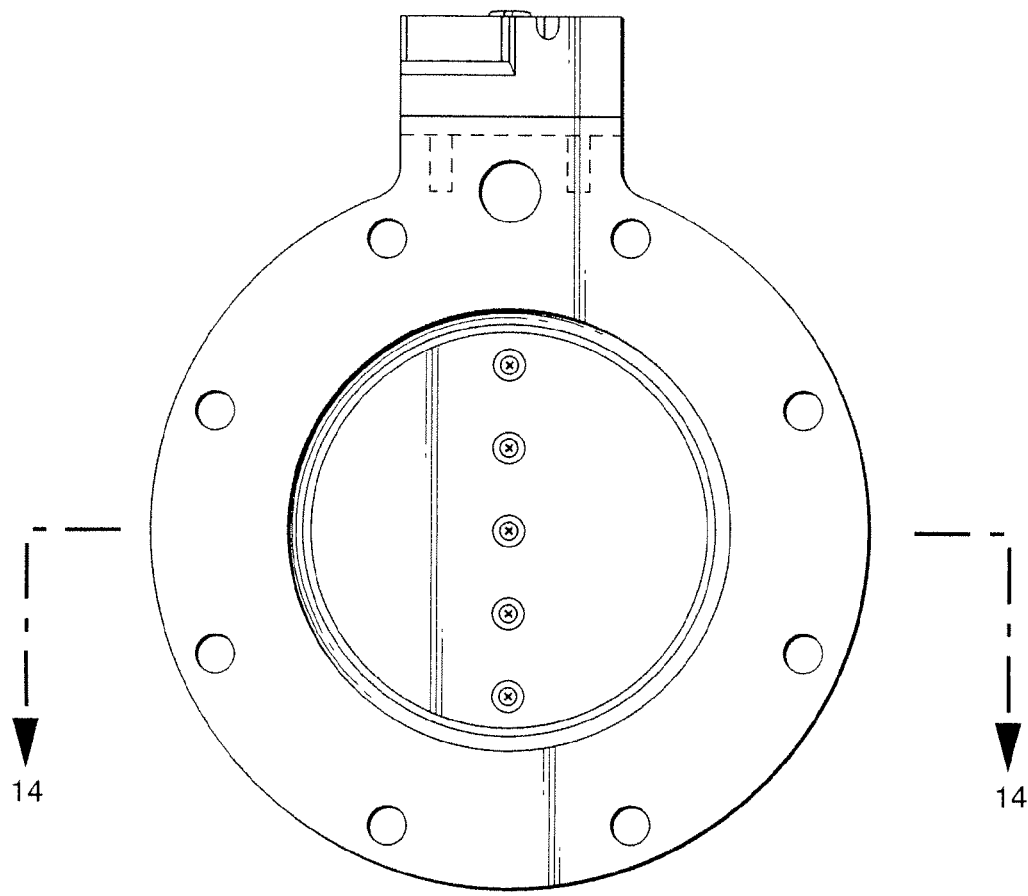
FIG. 13 is a front view of another embodiment of the flapper valve in which the valve opening is tapered and flapper is straight.
Figure 14:
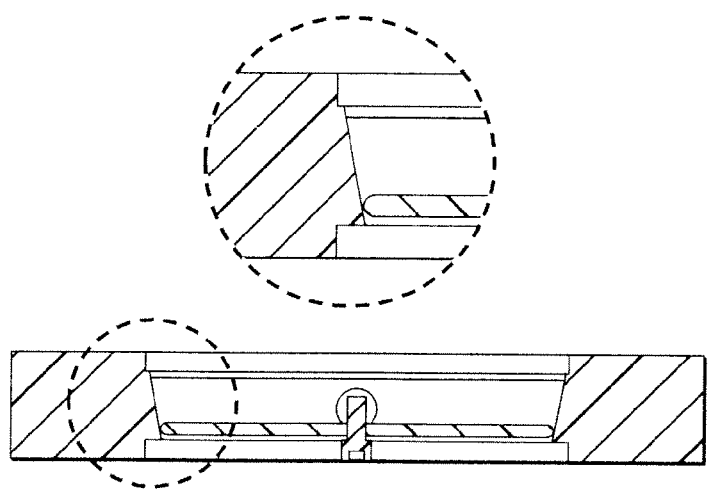
FIG. 14 is a cross sectional view of the flapper valve taken along section line 14-14 of FIG. 13.
Figure 15:
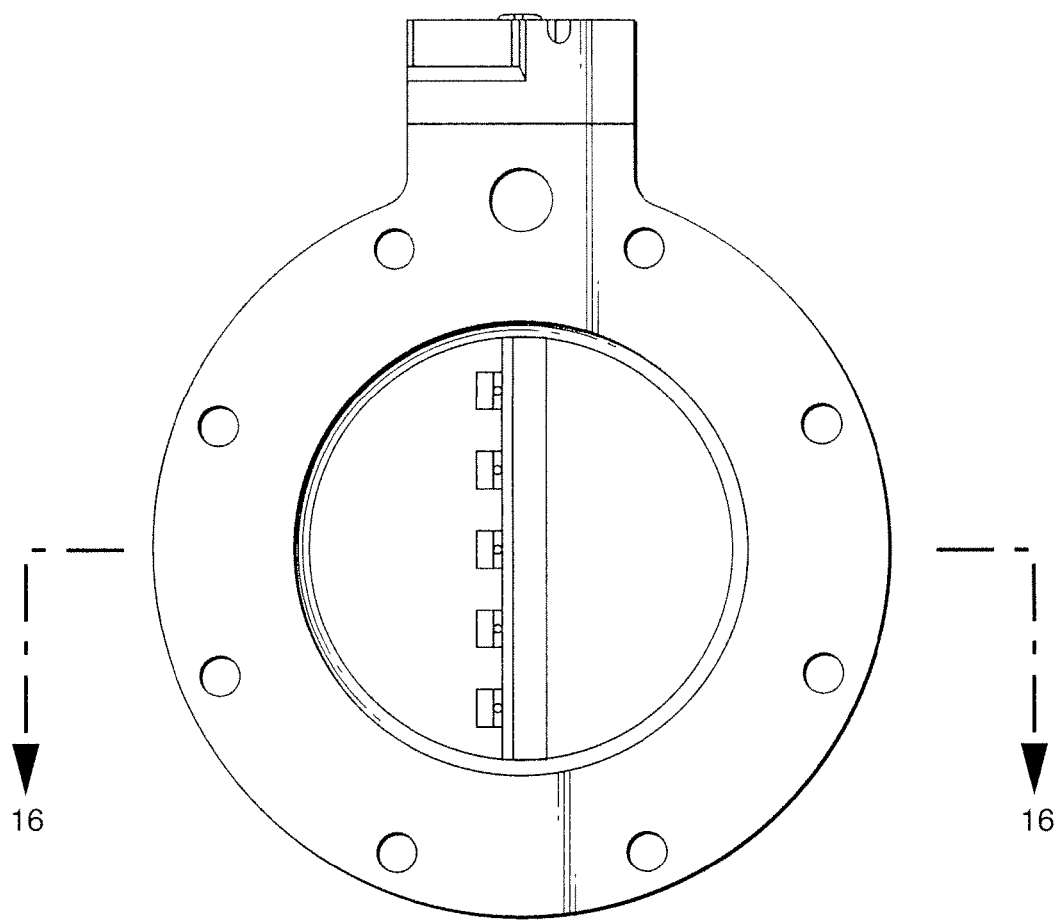
FIG. 15 is a front view of the embodiment shown in FIGS. 13 and 14 with the flapper in a fully opened position
Figure 16:
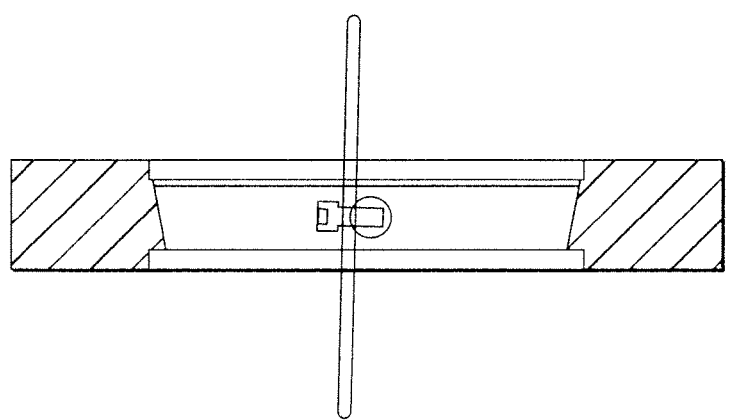
FIG. 16 is a cross sectional view of the flapper valve taken along section line 16-16 of FIG. 15.

FIGS. 7 and 8 show one embodiment in which the bore forming the valve opening and the valve flapper are both tapered with the valve (e.g., they are both frusto-conical in shape) shown in the closed position. FIGS. 9 and 10 show an embodiment in which the bore forming the valve opening is straight (i.e., cylindrical), and the flapper is tapered (e.g., frusto-conical in shape) shown in the closed position. FIGS. 11 and 12 show an embodiment in which the bore forming the valve opening and the flapper are both straight (i.e., cylindrical) shown in the closed position. FIGS. 13 and 14 show another embodiment in which the bore forming the valve opening is tapered (e.g., frusto-conical) which the flapper is straight (i.e., cylindrical) shown in the closed position. FIGS. 15 and 16 shown the embodiment shown in FIGS. 13 and 14 in a fully opened position.

As illustrated in FIGS. 12, 14 and 16 when the flapper 16 is untapered, the flapper is preferably centered with the shaft 18 and can provide complementary control in at least two and capable of providing complementary control in all four quadrants. These valves can therefore be configured to rotate at least 360°. As illustrated in FIGS. 8 and 10 when the flapper 16 is tapered, the shaft is typically offset from the flapper. In this instance the flapper can provide complementary control in two quadrants, wherein the flapper is rotatable between a first fully open position, a fully closed position 90° from the first fully opened position, and a second fully opened position 180° from the first fully opened position, and 90° from the fully closed position. It should be appreciated that the tapered flapper 16 in FIGS. 8 and 10 can still be rotated at least 360° to facilitate cleaning.

In accordance with another embodiment of the invention, the flapper 16 can be selectively rotated at least 360° so that it can be moved to either of the two opened positions and to either of the two closed positions so that any material deposited on the flapper during use will be distributed on both sides and on all of the edges of the flapper. Alternately exposing each side of the flapper and its opposite edges of the flapper by moving the flapper to complementary positions during use, reduces the affect of such deposited material on valve conductance and flapper movement so as to extend service life of the valve. The flapper 16 can be shaped as a disk and is rotatably mounted about the rotation axis 22 in either direction between a fully opened position wherein the disk of the flapper is substantially oriented 90° or 270° relative to the opening 14 so as to allow maximum flow through the valve opening, and a fully closed position wherein the disk of the flapper is oriented 0° or 180° to close the valve opening so as to provide minimum flow through the valve opening. The shaft 18 is rotatably mounted relative to the valve opening, wherein the flapper is fixedly secured relative to the shaft so as to rotate with the shaft relative to the valve opening. As described the shaft 18 is rotatably driven by a reversible stepper motor so that the flapper can be rotated in either of two directions.

Figure 5:
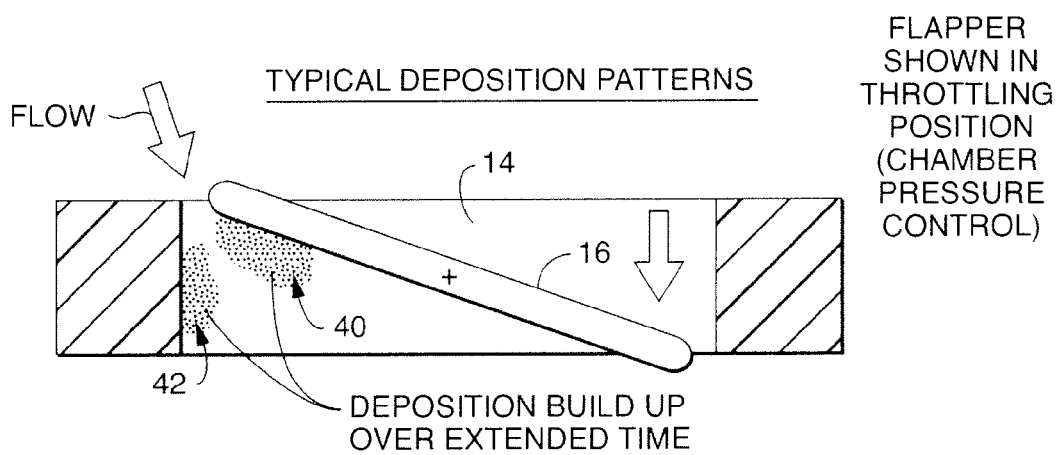
FIG. 5 is a simplified cross-section taken through the flapper illustrating typical deposit buildup due to use.

In accordance with another aspect of the invention, as best seen in FIG. 5 deposited material 40 and 42 may accumulate on either side and around the edges of the flapper 16 and along the interior portion of the opening 14 adjacent the edges of the flapper 16 as the flapper moves into and out of either closed position. The deposits can be removed or dislodged by (a) rotating the flapper 16 so as to expose each side of the flapper and the various edges of the flapper to a cleaning fluid flowing through the valve so that the fluid flowing through the valve can dislodge the deposited material exposed to the flowing fluid, and/or (b) moving the flapper into, through and out of either or both of the closed positions in either or both rotational directions so that the edge of the flapper can help dislodge deposited material on interior portions of the valve opening.

Figure 17:
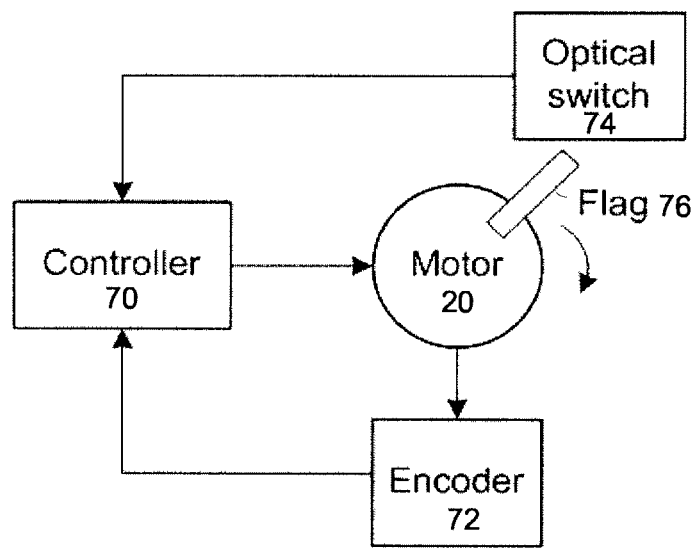
FIG. 17 is a simplified block diagram illustrating the control system for calibrating and controlling the position of the flapper.

Reference is now made to FIGS. 17-21 for facilitating an understanding, by way of example, of various aspects of the operation of the flapper valve 10. In FIG. 17, a controller 70 is used to control the motor 20. An encoder 72 is used to sense the position of the flapper (fixed to the shaft 18). An optical switch 74 is also provided to sense the position of flag 76 which occurs when the flapper is at an arbitrarily chosen reference position hereinafter referred to as the "home" position. By choosing an arbitrary home position the device will sense the home position, and determine each fully opened and fully closed positions in accordance with a calibration process such as the one described below in connection with FIG. 18. It should be appreciated that the functions used in operating the valve can be implemented in software, firmware or hardware, or any combination thereof, or other suitable form.

Figure 18:
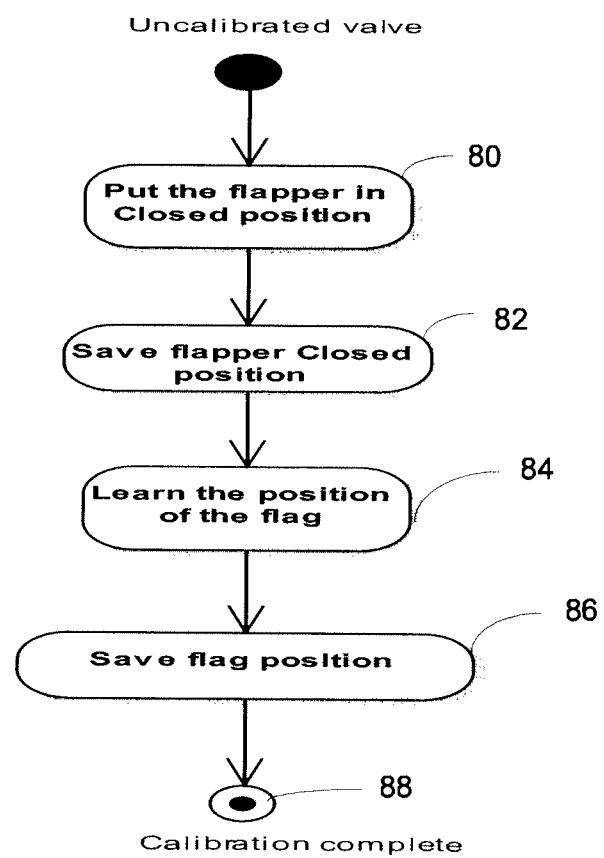
FIG. 18 is a flow chart of the calibration process for calibrating the position of the flapper of the flapper valve relative to the open and closed positions.

FIG. 18 shows a flow chart of one embodiment of a process of calibrating the device. Once calibration is done, a control option is selected and then performed, as shown by way of example in FIGS. 19-21. The calibrated valve is then ready for its normal operation.

In FIG. 18, the function of the calibration process is to locate the flag 76 with respect to one of the fully closed positions of the valve. This can be done at the factory where the valve is manufactured. The initial step at 80 is to place the flapper in one of the fully closed positions based upon the encoder 72 readout to the controller. The encoder readout is then stored in memory (provided in controller 70) at step 82 to designate that reading as a fully closed position. The two opened positions, and in the embodiment where the flapper is rotatable through at least 360°, the other closed position are then easily determined from this set point. The position of the flag 76 is then determined with the optical switch 78 at step 84 and cross correlated encoder reading of the fully closed position determined in step 82, and stored according in memory of the controller 70 at step 86. Once the information is stored, the calibration process is complete as indicated at step 88.

Figure 19:
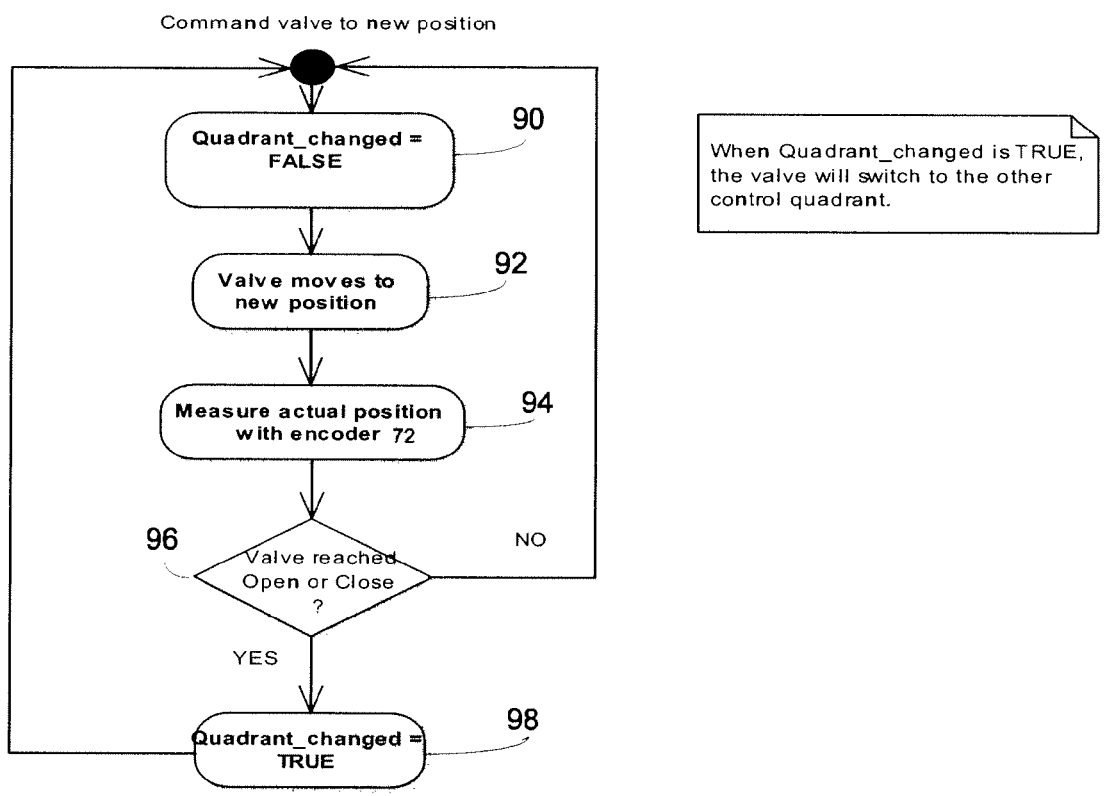
FIG. 19 is a flow chart of the cyclic operation of the control system following a selection process of the position of the flapper of the flapper valve.

FIG. 19 shows one embodiment of a selection process of selecting one of the operation options. This selection process is performed by the end user. The selection process can include the following options:
1. Change the quadrant with each cycle.
2. Change the quadrant once the valve slip has reached a selected threshold. Valve slip is the amount of displacement between the indicated flapper position as measured with the encoder 72 and the commanded flapper position. Slip is measured as a percentage of slip based on a 90° total movement range through a quadrant.
3. Provide automatic slip correction.

Describing these three options in greater detail, FIG. 19 describes the option of changing the quadrant with each cycle. This will help ensure that both sides of the flapper will alternately face the flow stream of the gas or vapor flowing through the valve so as to extend the use of the valve between cleanings.

Referring to FIG. 19, the process describes an example of how the valve can change to a new control quadrant once it has reached either a fully opened or a fully closed position. Initially, a command is issued to move the flapper to a new position. At step 90, a determination is made as to whether the quadrant has changed (as determined by the encoder 72). If there is no quadrant change, the valve is moved to the new position at step 92 and the actual position of the flapper is measured at step 94 with the encoder 72. If the valve has reached one of its fully opened or closed positions, the controller 70 will record that the quadrant boundary has been reached and is about to change at step 96. A change in the quadrant is determined at step 98 and an appropriate message is provided to the controller 70.

It should be appreciated that a quadrant is based on the position of the flapper between 0°-90° (the first quadrant), 90°-180° (the second quadrant), 180°-270° (the third quadrant) and 270°-360° (the fourth quadrant). The quadrants are repeated if the flapper rotates beyond 360°. The quadrant boundary is defined by any one of the fully opened and fully closed positions. If the valve has not reached a fully opened or closed position at step 96, the device waits for the next command to move the flapper to a new position.

Figure 6:
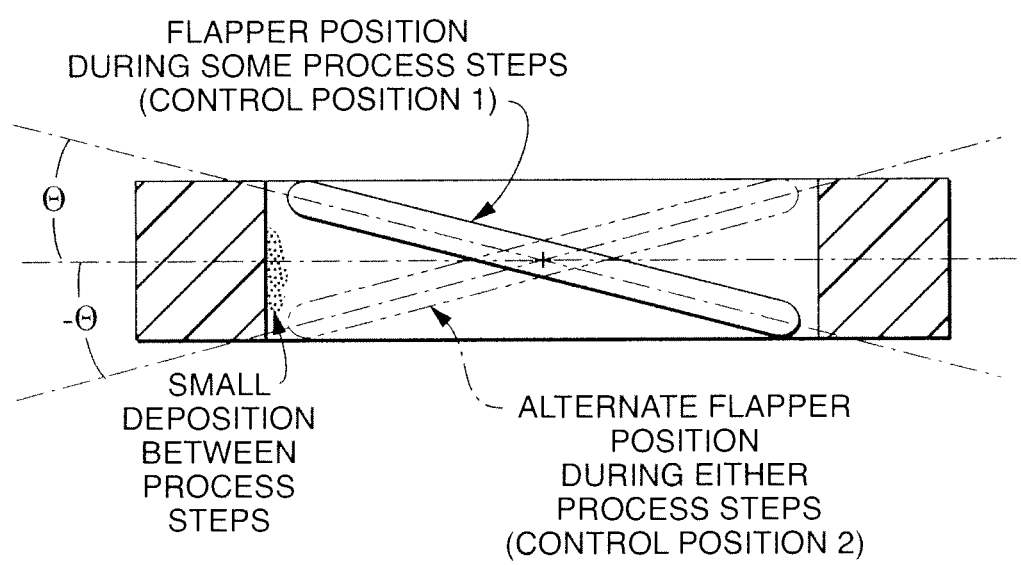
FIG. 6 is a simplified cross-section taken through the flapper illustrating two alternative angular positions of the flapper in two different quadrants providing the same rate of flow through the valve.

It should also be appreciated that a flapper position in one quadrant will provide the same flow control as when the flapper is positioned in complementary positions in the other three quadrants. For example, as illustrated in FIG. 6, if the flapper is positioned in the first quadrant at a 30° angle to the valve opening, the same rate of control will be achieved when the flapper is positioned in the second quadrant at a 150° angle to the valve opening, when the flapper is positioned in the third quadrant at the 210° angle to the valve opening (which is 180° from the position of the flapper in the first quadrant), and when the flapper is positioned in the fourth quadrant at the 330° angle to the valve opening (which is 180° from the position of the flapper in the third quadrant). Thus, more generally, as shown in FIG. 6 for each position of the flapper in the first quadrant where the angle is defined as $\Theta$, then the corresponding equivalent flapper positions providing the same control are $180°-\Theta$ (for the second quadrant), $180°+\Theta$ (for the third quadrant), and $360°-\Theta$ (for the fourth quadrant).

Figure 20:
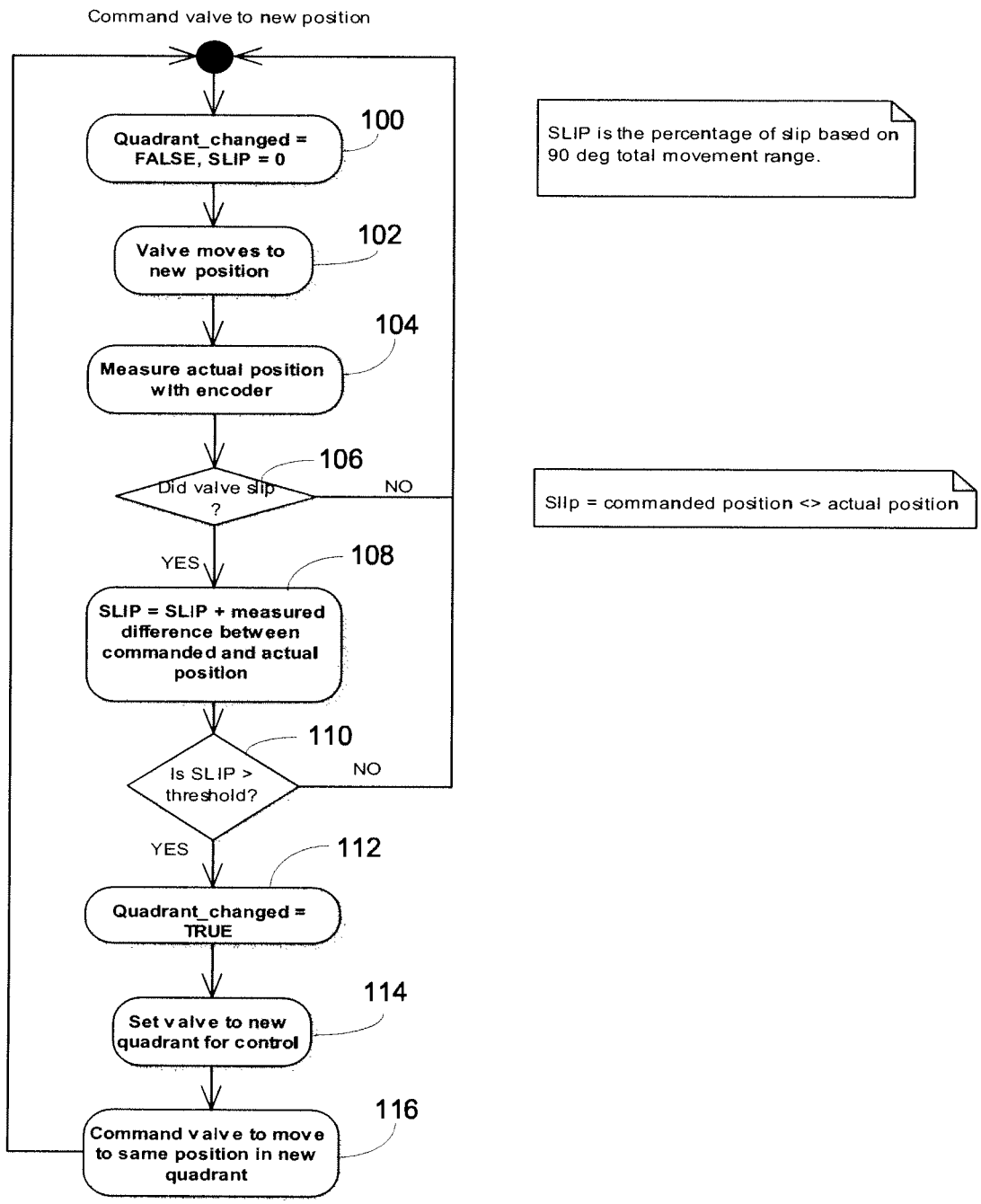
FIG. 20 is a flow chart of the operation of the control system regarding a slip threshold so as to set a maximum amount of valve slip.

In some cases, some valve slip can be tolerated. In this case the valve accumulates the slip error until it reaches a preset threshold. At that point the operating quadrant is changed and valve position reset. FIG. 20 describes the steps when it is necessary to change the quadrant once the valve slip has reached a selected threshold. When the valve controller 70 receives a command for a new valve position, the process proceeds to step 100. If the quadrant has changed, the slip will be set to zero, otherwise it will have any accumulated value from the previous setting. The valve is moved to a new position at step 102 and the actual position of the flapper is measured with the encoder at step 104. A determination is then made whether the valve has slipped further at step 106. If no, the process returns to wait for a new command to move the valve to a new position. If there has been some measured slippage at step 106, at step 108, the value of SLIP is then set to equal the accumulated value plus the additional slip measured. A determination is then made whether the new value of slippage has exceeded the set threshold at step 110. If no, the process returns to wait for a new command to move the valve to a new position. If yes, the process proceeds to step 112, wherein the quadrant is changed and the accumulated slippage is reset to zero. Once reset, the process proceeds to step 114, wherein the valve is set to the new quadrant for subsequent control. The process can then proceed to step 116, wherein the valve is commanded to move to the same position in the new quadrant as indicated by the encoder 70.

Figure 21:
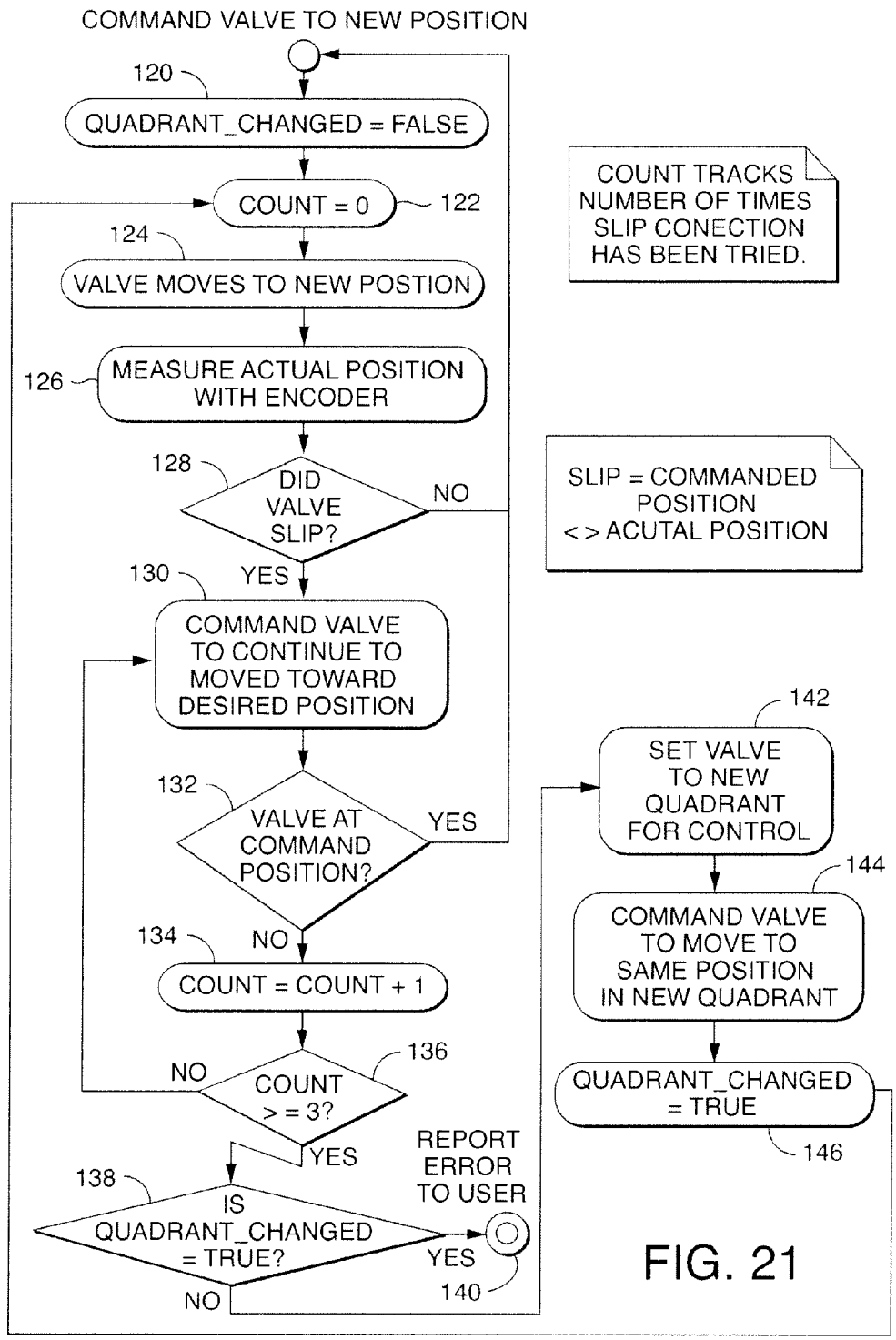
FIG. 21 is a flow chart of the operation of the control system providing auto-correction of the sensed position of the valve flapper.

Autocorrection can also be employed. Autocorrection tries to move the valve several times to a commanded position. If the slip continues to occur, the control quadrant is changed and the valve tries to move to the commanded position in another quadrant. FIG. 21 illustrates the steps taken to provide automatic slip correction. As indicated, when the controller receives a command to move the valve to a new position, the quadrant is changed at step 120, and the count regarding the amount of slip is considered zero at step 122. The valve flapper moves to the new position at step 124. Again the actual position of the flapper is measured using the encoder 72 at step 126. If there was no slippage the process returns to the start position, and waits for the next command.

If slippage is measured at step 128, the process proceeds to step 130. At step 130, the valve is commanded to continue to move toward the desired position to reduce the slippage to zero. If the valve is at the commanded position at the next step 132, the valve will return and wait to receive the next command to the valve to move to a new position. If however the valve is not at the desired position at step 132, the count is incremented at step 134. Step 134 provides the function of counting the number of times slip correction has been tried. If the process steps 130 and 132 have not repeated a predetermined number of times (in the example shown three times), the process repeats steps 130, 132 and 134. After three times the device determines if the move has been attempted in both quadrants at step 138. If Yes, the device reports an error to the user at 140. If no, the device proceeds to step 142 where the valve is set for the new quadrant for control. The next step 144, the valve is commanded to move to the same (complementary) position in the new quadrant. And at step 146 the quadrant is changed to the true value. The device then attempts to move the valve to the new position in the other quadrant specified in step 146.

The solution described can prolong the service life of the flapper valve without added cost or mechanical complexity. The motion profiles required can be modified and updated based on software alone allowing greater flexibility with low revision cost. The service life of the gear train can also be extended because the specific operating point of the gearing/motor would shift based on flapper opening direction. The features described in connection with FIGS. 17-21 can also be implemented by the manufacturer or the end user as use options depending upon the customer processes and needs. The end user may want to disable these features if it is determined that operation from one quadrant to the next negatively affects the gas dynamics in the tool.

It should be evident that where the flapper is rotatable at least 360°, a method can be used to maintain the flapper valve clean of material deposited on both sides and all of the edges of the flapper and in a valve opening during use by exposing the flapper to a cleaning material flowing through the valve while operating the flapper so as to (a) expose each side of the flapper and the various edges of the flapper to the cleaning material flowing through the valve so that the fluid flowing through the valve can remove and/or dislodge the deposited material exposed to the flowing fluid, and (b) move the flapper into, through and out of either or both of the closed positions in either or both rotational directions so that the edge of the flapper can help dislodge deposited material on interior portions of the valve opening.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Further, the valve is described as useful with deposition systems where gas and vapors are delivered to a vacuum chamber. The valve, however, is useful as a gas and vapor delivery system with any system using gas or vapor wherein undesired deposits can occur in the valve. For example, the valve can be used with an etching tool. Thus, the present invention is not intended to be limited to the embodiments shown herein, but is to be accorded the full scope consistent with the claims.

What is claimed is:

1. A butterfly valve comprising:
   a valve body including a valve opening; and
   a flapper rotatably mounted within the valve body about a rotation axis so as to be rotatable to any desired valve opening amount between and including either of two possible angular positions that are 180 degrees apart;
   a flapper positioner having a configuration that, in response to a command to rotate the flapper to a desired angular position, can rotate the flapper to the desired angular position; and
   a flapper controller having a configuration that causes the flapper controller to:
   receive a command to move the flapper to a desired valve opening amount; and
   for each desired valve opening amount:
   determine by measuring valve slip which of the two possible angular positions that are 180 apart for that desired valve opening amount the flapper should be positioned based on a goal of cleaning deposited debris from the flapper and the valve body; and
   command the valve positioner to rotate the flapper to the determined angular position.

2. A butterfly valve according to claim 1, wherein the flapper is rotatable at least substantially 360° in either of two directions.

3. A butterfly valve according to claim 1, further including a shaft rotatably supporting the flapper, and wherein the flapper positioner comprises a reversible stepper motor.

4. A butterfly valve according to claim 3, wherein the flapper is shaped as a disk and is rotatably mounted about the rotation axis in either direction between a fully opened position wherein the disk of the flapper is oriented substantially 90° or 270° relative to the opening so as to allow maximum flow through the valve opening, and a fully closed position wherein the disk of the flapper is oriented substantially 0° or 180° to close the valve opening so as to provide minimum flow through the valve opening.

5. A butterfly valve according to claim 1, wherein the flapper is shaped as a disk, and the disk is tapered.

6. A butterfly valve according to claim 5, wherein the valve opening is tapered.

7. A butterfly valve according to claim 1, wherein the flapper is shaped as a disk, and the disk is untapered.

8. A system comprising:
   a conduit for conveying material from a tool;
   a valve comprising:
   a valve body including a valve opening;

a flapper rotatably mounted within the valve body about a rotation axis so as to be rotatable to any desired valve opening amount at either of two possible angular positions that are 180 degrees apart;

a flapper positioner having a configuration that, in response to a command to rotate the flapper to a desired angular position, can rotate the flapper to the desired angular position; and a flapper controller having a configuration that causes the controller to:

receive a command to move the flapper to a desired valve opening amount; and for each desired valve opening amount:

determine by measuring valve slip which of the two possible angular positions that are 180 degrees apart for that desired valve opening amount the flapper should be positioned based on a goal of cleaning deposited debris from the flapper and the valve body; and command the flapper positioner to rotate the flapper to the determined angular position.

9. A system according to claim 8, wherein the flapper is operative to be selectively moved to either of the opened positions and to either of the closed positions so that any material deposited on the flapper during use will be distributed on both sides and on all of the edges of the flapper during use so as to reduce the effect of such deposited material on valve conductance and flapper movement so as to extend service life.

10. A system according to claim 8, wherein the flapper is rotatable at least substantially 360° in either of two directions.

11. A system according to claim 8, further including a shaft rotatably supporting the flapper, and wherein the flapper positioner comprises a reversible stepper motor.

12. A system according to claim 8, wherein the flapper is shaped as a disk and is rotatably mounted about the rotation axis in either direction between a fully opened position wherein the disk of the flapper is oriented substantially 90° or 270° relative to the opening so as to allow maximum flow through the valve opening, and a fully closed position wherein the disk of the flapper is oriented substantially 0° or 180° to close the valve opening so as to provide minimum flow through the valve opening.

13. A system according to claim 12, further including a shaft rotatably mounted relative to the valve opening, wherein the flapper is fixedly secured relative to the shaft so as to rotate with the shaft relative to the valve opening.

14. A system according to claim 8, wherein the flapper is shaped as a disk, and the disk is tapered.

15. A system according to claim 8, wherein the valve opening is tapered.

16. A system according to claim 8, wherein the flapper is shaped as a disk, and the disk is untapered.

* * * * *